Patented Mar. 6, 1928.

1,662,015

UNITED STATES PATENT OFFICE.

LORIN B. SEBRELL AND JAN TEPPEMA, OF AKRON, OHIO, ASSIGNORS TO THE GOODYEAR TIRE & RUBBER COMPANY, OF AKRON, OHIO, A CORPORATION OF OHIO.

METHOD OF PREPARING THIAZOLES.

No Drawing. Original application filed June 17, 1925, Serial No. 37,861. Divided and this application filed March 16, 1927. Serial No. 175,922.

Our invention relates to the preparation of mercaptothiazoles and it particularly pertains to that class of the above designated materials which embodies in its structure an aryl-group or substituted derivative thereof.

This application is a division of our copending application, Serial No. 37,861, filed June 17, 1925.

The object of this invention is to provide a new method of preparing mercaptothiazoles.

Briefly, the invention consists in reducing ortho-nitro-halide compounds with a soluble basic hydro-sulfide such for examples as the sodium or ammonium derivatives in the presence of carbon bisulfide and hydrogen sulfide.

Mercaptothiazoles and many of their derivatives are known to possess desirable accelerating properties in the vulcanization of rubber. Many have been prepared and incorporated in caoutchouc mixes, chief among which may be mentioned 2-mercaptobenzothiazole, 2-mercapto-4-methyl-benzothiazole, 2-mercapto-4-methylthiazole, 2-mercapto-4-phenylthiazole, the structural formulas of which may be respectively designated as follows:

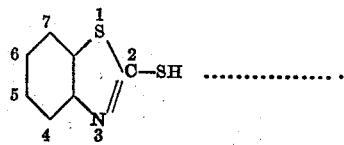

2-Mercaptobenzothiazole

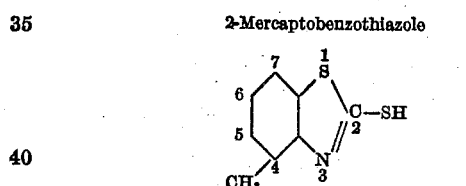

2-Mercapto-4-methyl-benzothiazole

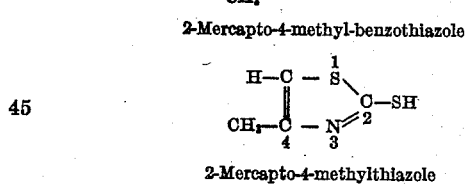

2-Mercapto-4-methylthiazole

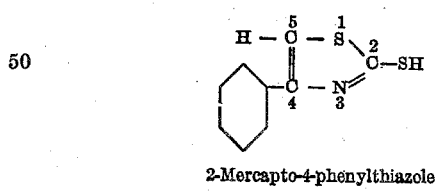

2-Mercapto-4-phenylthiazole

Several methods of preparing these derivatives are known; of these might be mentioned the treatment of a substituted thiourea with sulfur under pressure and the preparation involving the reaction of an aryl amine, carbon bisulfide and sulfur. The present method is characterized as one which utilizes cheap raw materials and requires little or no expensive equipment in securing the reaction. Moreover, a good yield may be had even when the reaction is effected at relatively low temperatures, and in addition, a water solution may be employed thereby obviating the necessity of costly solvents.

The preparation of 2-mercaptobenzothiazole may be taken as characteristic, for purposes of illustrating the application of the principles of our invention. One hundred parts of ortho-nitro-chlorbenzene are suspended in a water solution of two hundred fifty parts of sodium sulfide, previously saturated with hydrogen sulfide. The mixture is warmed slightly and hydrogen sulfide, which is saturated with carbon bisulfide, is passed through the solution. We have found that a ninety percent yield is obtained when the reaction is carried out at atmospheric pressure and between 60° and 90° C. In order to reduce the time of reaction, however, a positive pressure of the gaseous materials which may aggregate 250 pounds per square inch and an elevated temperature which even exceeds 150° C. may be employed. In the latter case, the yield is somewhat impaired although the time necessary to complete the reaction is materially reduced. Subsequently the reacted mixture is steam distilled to remove undesirable by-products or raw materials, after which the charge is acidified. The precipitated product thus formed is relatively pure, but by extracting with dilute alkali and reprecipitating, the comparatively pure mercaptan is obtained.

Although we specify that carbon bisulfide be added with the hydrogen sulfide, this is not entirely necessary as it may be added in liquid form if so desired. Furthermore, it will be appreciated that, while we have specifically named sodium sulfide, any soluble basic sulfide, or hydrosulfide will suffice. The reaction is probably as follows:

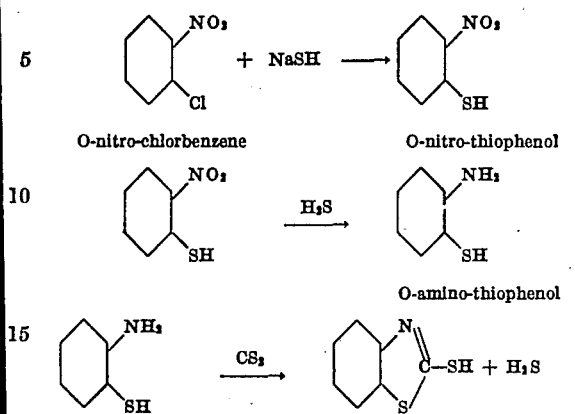

O-nitro-chlorbenzene  O-nitro-thiophenol

O-amino-thiophenol

Many modifications of this invention will be readily apparent. For example, diortho-dinitro-diphenyl-disulfide, which itself may be easily prepared from ortho-nitro-chlorbenzene by reacting with sodium polysulfide, is a convenient starting material. Thus, if five parts of the disulfide be suspended in one hundred parts of water, to which is added an equivalent quantity of a solution of sodium sulfide, that has previously been saturated with hydrosulfide and subsequently hydrogen sulfide that has been treated with carbon bisulfide is bubbled through the mixture, which is maintained at substantially 50° C., a theoretical yield of the 2-mercaptobenzothiazole is obtained in about five hours. The steps involved in its purification need not again be discussed. This alternative method comes clearly within the provisions of the present invention as will be readily appreciated by comparing the reactions involved.

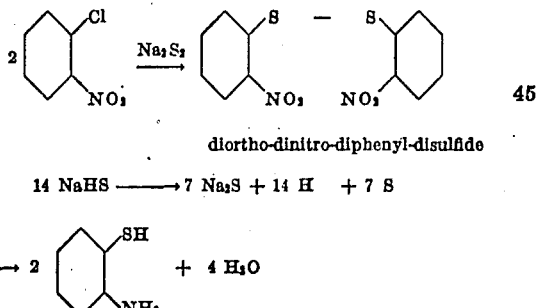

diortho-dinitro-diphenyl-disulfide

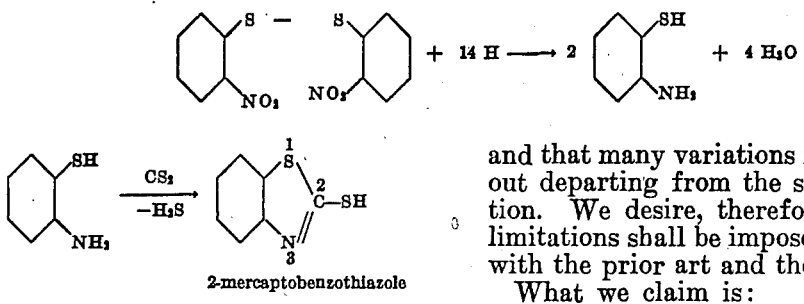

2-mercaptobenzothiazole

The final product is designated in accordance with the recognized authorities on chemical nomenclature.

The examples hereinabove set forth have been specific to the phenyl derivative, however, the characteristic of the raw materials essential to its successful utilization is that the nitro group and the chlorine or sulfur atom be attached to the adjacent carbon atoms. We therefore do not limit ourselves to hexa-cyclic structures but contemplate both open chain and ring structures which are so characterized. Perhaps the best known examples are the ortho-nitro-aryl halides.

Although we have disclosed but a single embodiment of the principles of our invention, together with a slight modification thereof, it will be appreciated by anyone skilled in the art that they may be extended to a large class of materials which are known to react in a manner analogous to the phenyl compound and that any of the intermediate products designated in the above reactions may be substituted for the original materials. Furthermore, while a set of reacting conditions have been specifically set forth, it is obvious that they are merely exemplary and that many variations may be made without departing from the scope of the invention. We desire, therefore, that only such limitations shall be imposed as are consistent with the prior art and the appended claims.

What we claim is:

1. A method of preparing a mercapto-aryl-thiazole, that comprises causing the corresponding diortho-dinitro-diaryl-disulfide to react with an alkaline hydrosulfide in the presence of carbon bisulfide.

2. A method of preparing a mercapto-aryl-thiazole, that comprises causing the corresponding diortho-dinitro-diaryl-disulfide to react under the influence of positive pressure and elevated temperature with an alkaline hydrosulfide in the presence of carbon bisulfide.

3. A method of preparing mercaptobenzothiazole, that comprises causing the corresponding diortho-dinitro-diaryl-disulfide to react with an alkaline hydrosulfide in the presence of carbon bisulfide.

4. A method of manufacturing 2-mercaptobenzothiazole which comprises, causing diortho-dinitro-diphenyl-disulfide to react with a water solution of a basic sulfide in the presence of hydrogen sulfide and carbon bisulfide.

In witness whereof, we have hereunto signed our names in the presence of two subscribing witnesses.

LORIN B. SEBRELL.
JAN TEPPEMA.